Sept. 12, 1967  E. G. NEWMAN ET AL  3,341,795
FORCE TRANSDUCER
Filed Nov. 19, 1965
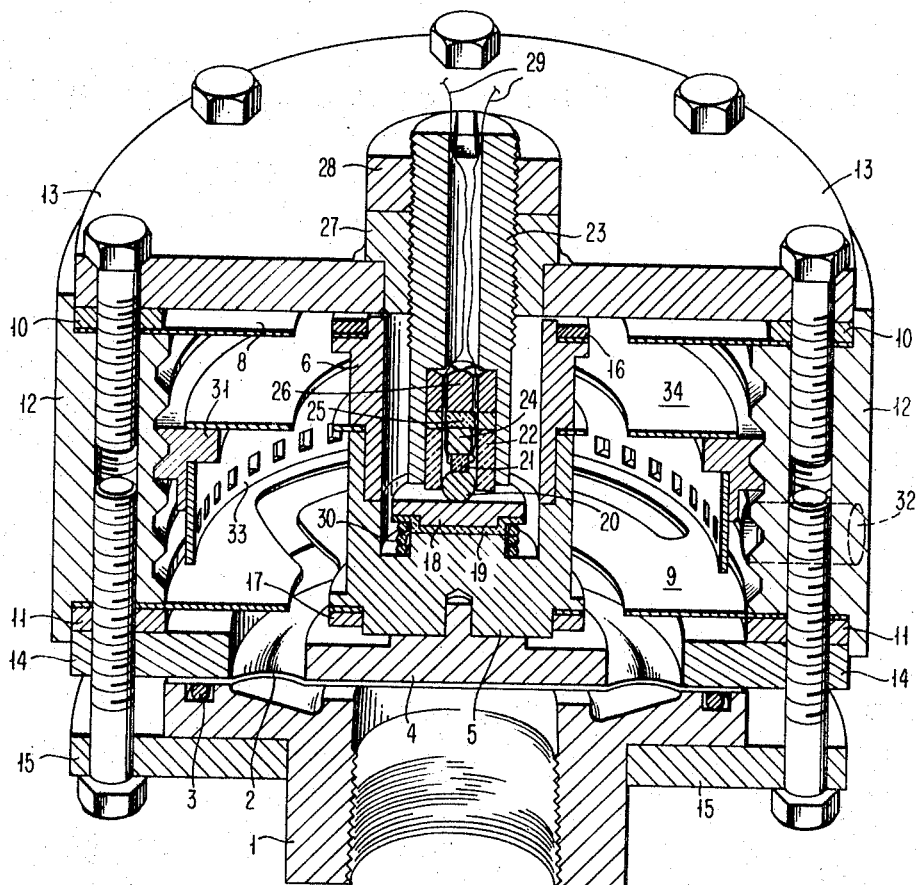
FIG. 1
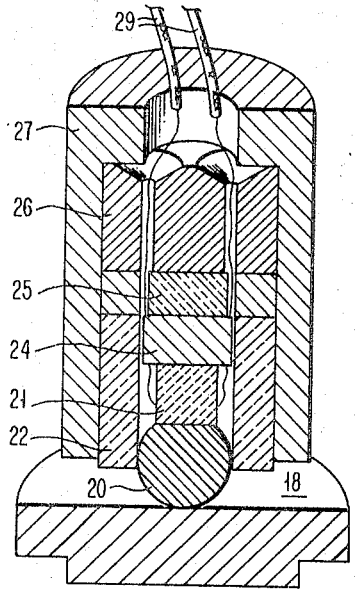
FIG. 2
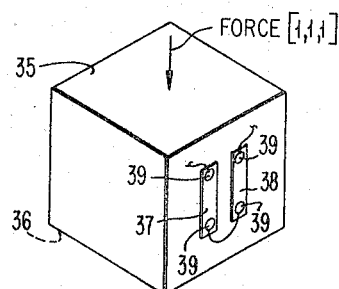
FIG. 3
FIG. 4
INVENTORS.
ERNEST G. NEWMAN
ROY R. SMITH
KONRAD H. STOKES
BY
ATTORNEY United States Patent Office 3,341,795
Patented Sept. 12, 1967

3,341,795
FORCE TRANSDUCER
Ernest G. Newman, Los Gatos, Roy R. Smith, San Jose, and Konrad H. Stokes, Los Gatos, Calif., assignors to International Business Machines Corporation, Armonk, N.Y., a corporation of New York
Filed Nov. 19, 1965, Ser. No. 508,799
4 Claims. (Cl. 338—5)

ABSTRACT OF THE DISCLOSURE

A force transducer utilizing a semiconductor cube having elongate gauge elements on one of the lateral faces. Force is applied to the base of the cube to provide a change in resistance in the elements proportional to the change in force. The cube is of one semiconductor type and the elements are of another semiconductor type. The resulting junction provides electrical isolation between the cube and the gauge element.

---

This invention relates to a force sensitive semiconductor element.

The piezoresistive property of semiconductor materials provieds a convenient means for the measurement of forces. A typical device utilizing this property includes a semiconductor sensing element affixed to a member in which the strain is proportional to the unknown force. For example, a semiconductor element may be affixed to a column which is distorted by the force to be measured or to a diaphragm whichi s distorted by the pressure to be measured. Other devices involve the fabrication of a semiconductor beam element having sensing elements as an integral portion thereof. The force to be measured is applied to the beam in a manner such that the semiconductor elements on the top and the bottom are placed in either tension or compression, respectively.

While these devices have been effective to provide a greater output signal than wire type strain gauges, the full advantage of the semiconductor strain element has not been realized. In the case where the semiconductor element is bonded to the structure in which strain is to be measured, the problem of bonding is still present. Since any slippage results in hysteresis, bonding must be very carefully done to provide a satisfactory device. In the case where the semi-conductor element is fabricated in the form of a beam, some means must be provided for preventing fracture of the beam from overloads. If this is not done, the range of the device must be severely limited.

Another problem with these devices is the difficulty of fabrication. The semiconductor elements are quite small and a great deal of precision is required in their manufacture. The small size and fragility of the semiconductor element further complicates bonding, in the case where the element is affixed to a structural member, or the mounting of a beam in other applications of these devices.

In the typical application of the prior art devices, the output signal is a function of the strain induced in the element by the stress to be measured. While it is usually the case that applied force or stress is the unknown value to be determined, it is strain which produces the output signal. It is obvious that the measurement of stress is accurate only where the strain induced thereby does not affect stress. Where force is to be measured, the existing devices are inaccurate to the extent that the strain necessary to provide an output signal affects the applied stress.

It is an object of this invention to provide a semiconductor force sensor having substantially improved overload capabilities.

It is another object of this invention to provide an improved semiconductor force sensing element in which no bonding to the parent structure is required.

Still another object of this invention is to provide an easily fabricated and mounted semiconductor force sensor.

Still another object of this invention is to provide a force transducer which functions with greatly reduced strain.

A still further object of this invention is to provide an improved means for loading a semiconductor force sensor.

In this invention, the nearly perfect elastic properties of silicon in its crystalline form are utilized to provide the spring action. The exceptionally high spring gradient results in an electrical output signal proportional to the applied force. Instead of the customary approaches, which require that the sensing element be affixed to a separate member, or the use of a beam-type semiconductor element, this invention provides for the compressive loading of a first conductivity type semi-conductor cube having a piezoresistive sensing element, of the opposite type conductivity material, located on one of the lateral faces of the cube. The output signal is derived from the force induced change in resistance of the element located on the lateral face of the cube.

A silicon cube is fabricated of a first conductivity type, say N type silicon. The elongate gauge elements are diffused or epitaxially grown on one of the lateral faces in a direction having a long dimension parallel to the applied force. The application of a force against the ends or bases of the cube causes a substantial change in resistance in the gauge elements, proportional to the applied force. This relationship holds true within the elastic limit of the cube.

Since a silicon crystal is able to withstand a much greater force applied as a compressive load than it can when the force is applied in a manner to produce tension, a piezoresistive output sipnal may be derived from this device which is substantially larger than the signal from prior art devices. This is due to the fact that a greater stress may be tolerated by the block, thereby providing a greater change in resistance in the semiconductor elements, or, if it is desired to obtain a substantial overload capability in the sensing device, a larger output signal may be obtained for a given overload capability.

Use of a semiconductor block in this manner provides an output signal which is proportional to the applied force. The resistance change in the elements is caused by a distortion of the crystalline structure. Large changes in resistance are created by strains of only 2 or 3 ten thousandths of an inch, resulting from 150 pounds of force to the cube.

The foregoing and other objects, features and advantages of the invention will be apparent from the following more particular description of a preferred embodiment of the invention as illustrated in the accompanying drawings.

FIGURE 1 is an isometric projection of a longitudinal section through a presure transmitter embodying the invention.

FIGURE 2 is a detail drawing of the portion of FIG. 1 which includes the semiconductor device.

FIGURE 3 is a detail drawing showing the location of the active elements of the semiconductor device of FIGURES 1 and 2.

FIGURE 4 is a drawing showing the semiconductor device in an intermediate stage of manufacture.

In the device of FIGURE 1, suitable connection to the system in which pressure is to be measured is made through the lower aperture in pressure connection member 1. The upper portion of the aperture is closed by means of pressure sensing diaphragm 2 and O-ring 3. Pressure changes in the system to be measured cause a change in force against diaphragm 2 and its attendant diaphragm area plate 4, affixed to the upper surface of diaphragm 2. Area plate 4 is in turn affixed to the lower center sleeve 5 and an upper center sleeve 6.

The center sleeve assembly is maintained in a central position with respect to diaphragm 2 by means of spiral centering springs 8 and 9. The centering springs 8 and 9 are held in place by upper retaining ring 10 and lower outer retaining ring 11 which are clamped against outer housing 12 by means of bolts passing through upper support plate 13, diaphragm support ring 14 and pressure connection retainer 15. The upper centering spring 8 and lower centering spring 9 are held to the upper and lower center sleeves by means of inner retaining rings 16 and 17 respectively. In this manner, changes in pressure in the lower chamber defined by diaphragm 2 cause a change in the upward force applied along the vertical axis to center sleeves.

A ball loading plate 18 has a ceramic or other type insulating coating 19 to electrically isolate it from lower center sleeve 5. The upper surface of ball loading plate 18 is in engagement with loading ball 20. The force against diaphragm 2 is transmitted to a first base of silicon block 21 by means of loading ball 20. Loading ball 20 has a planar surface in engagement with silicon block 21 and a spherical surface bearing against ball loading plate 18. This block may be a right prism or cube. The sleeve 22 of electrically insulating material, such as glass, positions ball 20 in the center of thrust screw 23. The second base of block 21 has a loading block 24 of a material such as steel to assure that even loading of block 18 is achieved. To secure electrical isolation at the upper surface of block 21, a layer of ceramic insulation 25 is included between loading block 24 and spacer 26. Appropriate side clearances are provided between loading block 24 and glass sleeve 22 to allow the connecting leads to be brought through holes in spacer 26. The upper face of spacer 26 bears against a corresponding face in thrust screw 23. Thrust screw 23 is held in fixed engagement with support plate 13 by means of a thrust screw sleeve 27 and locked in place by thrust screw nut 28.

When the pressure bearing against the lower surface of diaphragm 2 increases, it causes an increased force against diaphragm plate 4 and center sleeve assembly. This force is transmitted to the first base of silicon block 21 by means of ball loading plate 18 and loading ball 20. The block is fixed in place against upward movement by means of thrust screw 23, spacer 26, insulating layer 25 and loading block 24, which abuts the second base of block 21. The force against diaphragm 2 is thereby applied to silicon block 21 in a direction perpendicular to the bases of block 21. Changes in force applied to silicon block are indicated by changes in the resistance of the sensing elements 37 and 38 located on the lateral face of block 21. This change in resistance may be detected by measuring the resistance between the lead wires 29.

Spring 30 operates to displace ball loading plate 18 upward in the event that the device is severely jarred or a large decrease in pressure displaces diaphragm 2 in the downward direction to cause the movement of center sleeves 5 and 6 beyond that which would normally be obtained. This spring normally does not enter into the operation of the device because ball loading plate 18 abuts against lower center sleeves for the usual pressure range.

To allow adjustment of the pre-load on the silicon block 21 for a given pressure, a zero adjust screw 31 is provided. This screw rides in threads cut in the inner face of outer housing 12. A zero adjust hole 32 allows a screw driver or other suitable implement to be inserted into the inner chamber where engagement with holes in the zero adjust band 33 permits the assembly to be rotated along the threads. The displacement of zero adjust screw 31 upwards or downwards is communicated to block 21 by means of zero adjust spring 34 which rides in the slot formed between the lower and upper center sleeves 5 and 6. A displacement of zero adjust screw 31 upwardly, increases the loading on silicon block 21, whereas movement in the other direction reduces the loading on silicon block 21.

FIGURE 2 is an enlarged portion of the silicon sensor assembly shown generally in FIGURE 1. It can be seen that the ball 20 has a diameter somewhat larger than the largest dimension of block 21. This insures that the block 21 will be held away from glass sleeve 22. The flat upper face of ball 20 is of a dimension to provide a uniform loading over the lower surface of block 21. This method of loading block 21 operates to reduce the undesirable effects of a non-uniform loading on this face. It may be desirable that block 21 be affixed to the upper surface of ball 20 through some suitable means such as welding to a plated surface on block 21.

FIGURE 3 is a detail drawing of the silicon block itself. In this embodiment the block is a cubic shape having a dimension of approximately 80 mils per side. It is desirable that the upper and lower bases 35 and 36 be as close to parallel as possible. The block is of either N or P type silicon. In this embodiment with the block of N type material, the crystallographic 1,1,1 orientation is chosen. If a P type material were used it may be desirable to change the orientation for best results. The sensing elements 37 and 38 are elongate regions of a second conductivity type. The boundary region between the first and second conductivity type materials serves as a semiconductor junction barrier to isolate elements 37 and 38 from the remainder of the block. Sensing elements 37 and 38 have ohmic contacts 39 located at the ends thereof. These contacts may be made through deposition of gold or aluminum to the sensing element. It will be obvious that if more elements are desired they may be added provided the proper connection is made so that the change in resistance is additive.

It will be noted that the cubic shape of the semiconductor device is particularly well adapted to existing techniques of semiconductor manufacture. One such process would start with a slice of semiconductor material having a suitable orientation. The slice would be lapped on both sides to provide a uniform 80 mil thickness. Using existing optical and photographic techniques, a resist pattern of sensing elements 60 mils long and 10 mils wide, on 80 mil centers, may be developed on the slice. Since each device will be an 80 mil cube, a large number of devices may be made from a 1 inch diameter slice. After a suitable mask for the elements has been completed, diffusion of the appropriate dopant is accomplished. Diffusion is continued until the desired depth is reached. The element resistance is dependent on the dopant and the depth of diffusion. One-half to one micron has been found to be an acceptable depth.

When the diffusion is completed, the wafer is cleaned and prepared for deposition of the ohmic contacts. Another mask is laid down over the elements for the evaporation of a suitable material, such as gold, to provide a small dot at the ends of the elements. These dots provide a point for the subsequent connection of lead wires.

The wafer is again cleaned and affixed to a substrate. The mounted wafer is then sliced to provide the desired 80 mil cubes.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. A force transducer comprising:
a right prism of a first conductivity type semiconductor material,
said prism having first and second bases and a plurality of lateral faces,
an elongate piezoresistive gauge element of a second conductivity type in one of said lateral faces, said element being oriented with the longest dimension perpendicular to said bases,
support means adjacent said second base, force transmitting means adjacent said first base for applying a compressive load to said prism in a direction perpendicular to the plane of said second base, and
ohmic contact means at the extremities of said gauge element to provide therebetween a change in resistance proportional to the change in the applied compressive force.

2. A device according to claim 1 wherein said elongate piezoresistive gauge element of a second conductivity type in one of said lateral faces is produced by diffusion of a dopant material into said first conductivity type material.

3. A device according to claim 1 wherein said force transmitting means comprises a force transmitting member having planar and spherical surfaces,
said planar surface being in engagement with the entire area of said first base,
and means for applying a compressive force to said spherical surface to load said first base.

4. A device according to claim 3 wherein said compressive force is applied to said spherical surface in a direction perpendicular to said planar surface.

References Cited

UNITED STATES PATENTS

| | | | |
|---|---|---|---|
| 2,939,317 | 6/1960 | Mason | 338—2 |
| 3,037,178 | 5/1962 | Pien | 338—5 |
| 3,049,685 | 8/1962 | Wright | 338—2 |
| 3,121,337 | 2/1964 | Hollander | 338—2 |
| 3,149,488 | 9/1964 | Castro | 338—2 |
| 3,284,749 | 11/1966 | Fouretier | 338—5 |
| 3,293,585 | 12/1966 | Horn | 338—6 |

OTHER REFERENCES

"Semiconducting Stress Transducers Utilizing the Transverse and Shear Piezoresistance Effects," Pfann, W. G., et al., Journal of Applied Physics, vol. 32, No. 10, October 1961, pages 2008–2019.

RICHARD M. WOOD, *Primary Examiner.*

W. D. BROOKS, *Assistant Examiner.*